United States Patent [19]

Conn

[11] Patent Number: 4,964,930
[45] Date of Patent: Oct. 23, 1990

[54] ELECTRICALLY INSULATED FUEL TANK FOR HOT AIR BALLOON AND METHOD OF CONSTRUCTING SAME

[76] Inventor: Sidney H. Conn, 139 N. Mulberry St., Statesville, N.C. 28677

[21] Appl. No.: 336,501

[22] Filed: Apr. 10, 1989

Related U.S. Application Data

[63] Continuation of Ser. No. 80,293, Jul. 31, 1987, abandoned.

[51] Int. Cl.$^5$ .................. B32B 31/00; B65D 25/38
[52] U.S. Cl. .................................. 156/85; 156/86; 156/293; 156/294; 220/3; 264/342 R; 428/34.9
[58] Field of Search ................ 428/34.9; 156/85, 86, 156/293, 294; 264/342 R; 220/3

[56] References Cited

U.S. PATENT DOCUMENTS

| | | | |
|---|---|---|---|
| 4,190,168 | 2/1980 | Jacques | 428/34.9 |
| 4,589,562 | 5/1986 | Fawley | 220/3 |
| 4,690,295 | 9/1987 | Wills | 220/3 |
| 4,704,173 | 11/1987 | Hoffman | 156/86 |

FOREIGN PATENT DOCUMENTS 1104074  6/1981  Canada ........................ 220/3

Primary Examiner—James Seidleck
Attorney, Agent, or Firm—W. Thad Adams, III

[57] ABSTRACT

A fuel tank for a propane fuel tank includes an electrically insulative covering positioned in place over substantially the entire exposed surface of the tank to prevent transmission of electric current through the tank by contact of the tank with a source of current. The insulation on the tank also prevents penetration of the tank by arcing of electric current from a spaced apart current source and the tank. The fuel tank is cylindrical and the covering comprises an eight mil thick seamless tube of polyethylene secured by heat shrinking to the outer surfaces of the cylindrical tank. The method according to the invention comprises providing an electrically insulative material, placing the insulative material over the outer surfaces of the tank and bonding the insulative material to the outer surface of the tank.

7 Claims, 4 Drawing Sheets

ELECTRICALLY INSULATED FUEL TANK FOR HOT AIR BALLOON AND METHOD OF CONSTRUCTING SAME

This application is a continuation application of U.S. Ser. No. 080,293, filed July 31, 1987 now abandoned.

TECHNICAL FIELD AND BACKGROUND OF THE INVENTION

This invention relates to an electrically insulated propane fuel tank such as is used with hot air balloons to provide fuel to a burner which burns the fuel and projects heat into the balloon envelope. The fuel tank according to the invention described in this application is adapted to be used in connection with hot air balloons but can also be used for other applications, such as with propane powered forklift trucks, gas grills and recreational vehicles. In aviation use, the tanks are manufactured in compliance with 49 C.F.R. §178.

The particular utility and need of this invention in connection with hot air balloons arises out of the often disastrous consequences of inadvertent contact between a hot air balloon and electric power lines, particularly upon descent of the balloon. The balloon carriage is an open structure, and even though the fuel tanks are generally recessed somewhat under a control panel or overhang, contact between electric power lines and fuel tanks is a possibility. Direct contact between power lines and fuel tanks can provide a fatal electric shock to one touching the fuel tank, or some other structure or object which itself is in contact with the fuel tank. In addition and more importantly, very close proximity without contact between high voltage power lines and the fuel tanks can cause an arc between the lines and the tank. The line and the tank become electrodes, and when the arc is struck between the two, the atmospheric gases between them ar ionized. Ionized gas has a very low resistance to current flow. High current flow generates such high heat that very quickly the metal of the fuel tank "puddles", causing penetration of the fuel tank and detonation of the pressurized gas in the tank, with disastrous consequences.

Due to the dangers of inadvertent contact between hot air balloons and power lines, research and development is taking place to determine ways to eliminate as much metal as is possible from the balloon. In other instances, as here, where the use of metal is necessary, efforts are being made to protect the metal against contact with sources of electric current.

SUMMARY OF THE INVENTION

Therefore, it is an object of the invention to provide an electrically insulated metal fuel tank especially adapted for a hot air balloon.

It is another object of the invention to provide an electrically insulated metal fuel tank which can prevent both electric shock and arcing between the fuel tank and a source of electric current.

It is another object of the invention to provide a method of insulating a metal fuel tank to achieve the objects set out above.

These and other objects of the present invention are achieved in the preferred embodiments disclosed below by providing, in a metal fuel tank of the type used to contain gaseous fuel under pressure, the improvement which comprises an electrically insulative covering positioned in place over substantially the entire exposed surface of the tank to prevent transmission of electric current through the tank by contact of the tank with a source of current.

The insulation on the tank also prevents penetration of the tank by arcing of electric current from a spaced apart current source and the tank.

According to one preferred embodiment of the invention, the fuel tank is cylindrical and the covering comprises an eight mil thick seamless tube of polyethylene secured by heat shrinking to the outer surfaces of the cylindrical tank.

According to the method of the invention, a pressurized metal cylindrical fuel tank is insulated to prevent transmission of electric current through the tank by contact of the tank with a source of current, and penetration of the tank by arcing of electric current from a spaced apart current source and the tank. The method comprises providing an electrically insulative material, placing the insulative material over the outer surfaces of the tank and bonding the insulative material to the outer surface of the tank. Preferably, the insulative material comprises polyethylene in sheet form.

According to one preferred embodiment of the invention, the step of providing an insulative material comprises the steps of providing a sheet of polyethylene and forming the sheet into a tube.

According to another preferred embodiment of the invention, the step of forming the sheet into a tube comprises forming the sheet into a seamless tube.

According to another preferred embodiment of the invention, the step of forming the tube includes forming the tube in an initially-oversized tube with a diameter greater than the diameter of the tank. The step of bonding the insulative material to the outer surface of the tank comprises the step of shrinking the oversized tube into intimate surface contact with the outer walls of the tank.

Preferably, the step of forming the tube comprises extruding polyethylene in a seamless tube.

BRIEF DESCRIPTION OF THE DRAWINGS

Some of the objects of the invention have been set forth above. Other objects and advantages of the invention will appear as the description of the invention proceeds when taken in conjunction with the following drawings, in which.

DESCRIPTION OF THE PREFERRED EMBODIMENT

Figure 1:
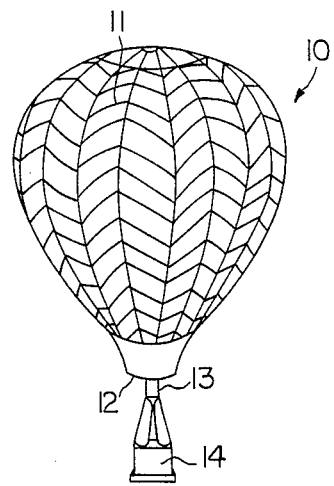
FIG. 1 is a perspective view of a hot air balloon of the type in which the insulated fuel tank is used.

Referring now specifically to the drawings, a hot air balloon of the type described in this application is shown and broadly indicated at reference numeral 10. Balloon 10 includes a fabric envelope 11 having a downwardly disposed opening 12 directly beneath which is suspended by load cords 13 a balloon carriage 14. Balloon carriage 14 carries the balloon fuel, burners and other equipment necessary for flight.

Figures 2, 3:
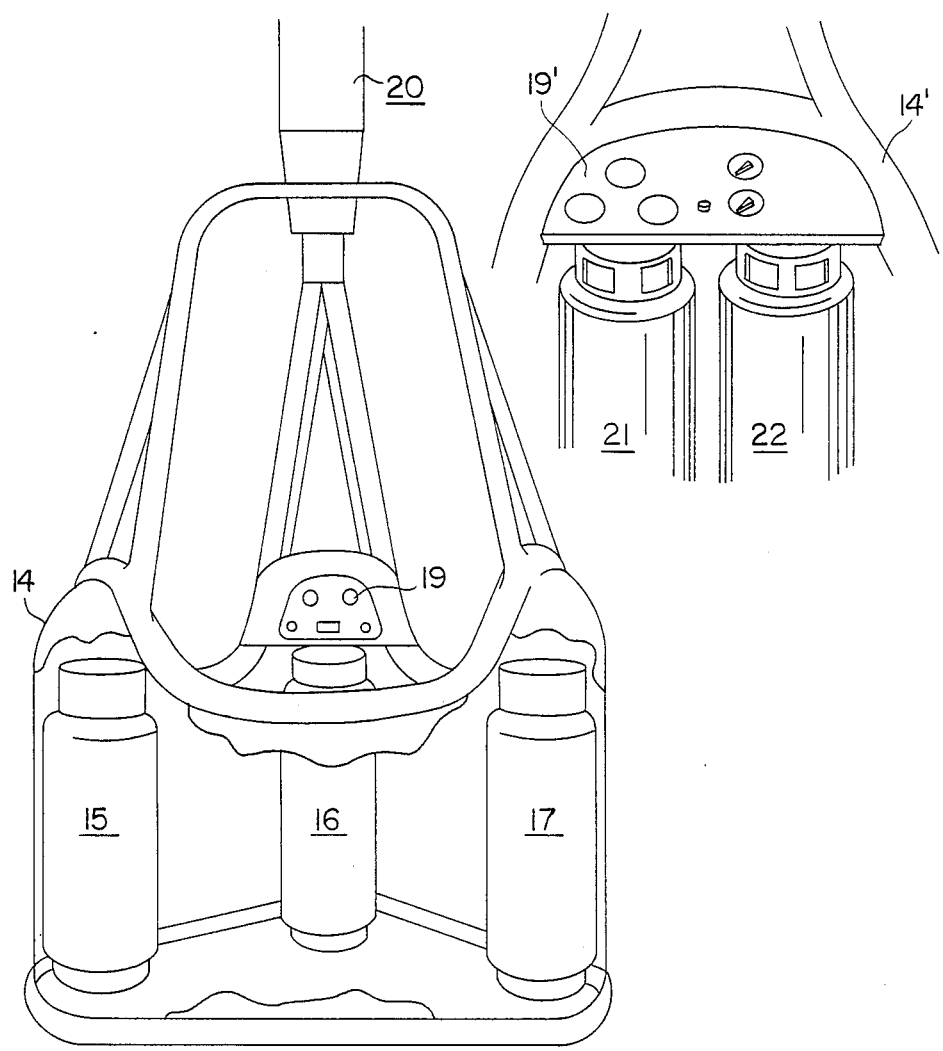
FIG. 2 is a fragmentary, greatly enlarged view, with parts broken away, of the balloon carriage shown in FIG. 1, illustrating the position of the fuel tanks.
FIG. 3 is a fragmentary view of a balloon carriage showing another view of the propane fuel tanks.

Referring now to FIG. 2, balloon carriage 14 according to the particular embodiment described herein is triangular and is constructed in such a manner as to provide corners within which propane tanks 15, 16 and 17 may be positioned. As is also shown in FIG. 2, one or more of the corners of balloon carriage 14 may be constructed in such a manner as to hold an instrument panel 19 within which are positioned various required aeronautical instruments. Propane from tanks 15, 16 and 17 is delivered under high pressure to a burner 20 positioned within opening 12, thereby delivering lift-inducing heated air to the interior of balloon envelope 11.

Referring now to FIG. 3, another typical type of propane tank arrangement is shown, whereby provision is made for two propane tanks 21 and 22 to be positioned within a single corner of a balloon envelope 14'. Again, an instrument panel 19' is positioned in the corner of balloon envelope 14'.

Figure 4:
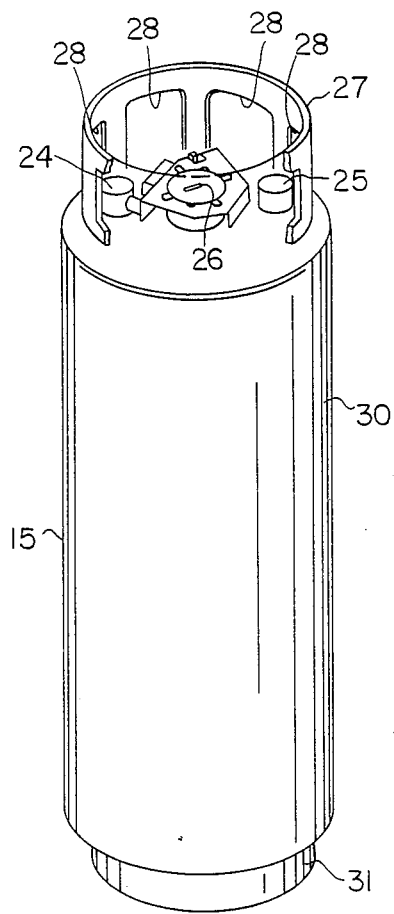
FIG. 4 is a perspective view of a propane fuel tank of the type used in hot air balloons, with a portion of the collar broken away for clarity.

Referring now to FIG. 4, propane tank 15, which will be referred to hereafter as exemplary of all of the above-identified propane tanks, includes two fuel delivery nozzles 24 and 25 which are connected to two fuel withdrawal tubes (not shown). The amount of propane remaining in the tank is indicated by means of a fuel gauge 26. The nozzles 24, 25 and gauge 26 are surrounded by a cylindrical collar 27 having several access openings 28 which also serve as handles.

The body of the tank comprises a cylindrical body 30, which rests on a footring 31 of reduced diameter. For aviation uses, the tanks are made of steel and according to fixed government standards.

Figure 5:
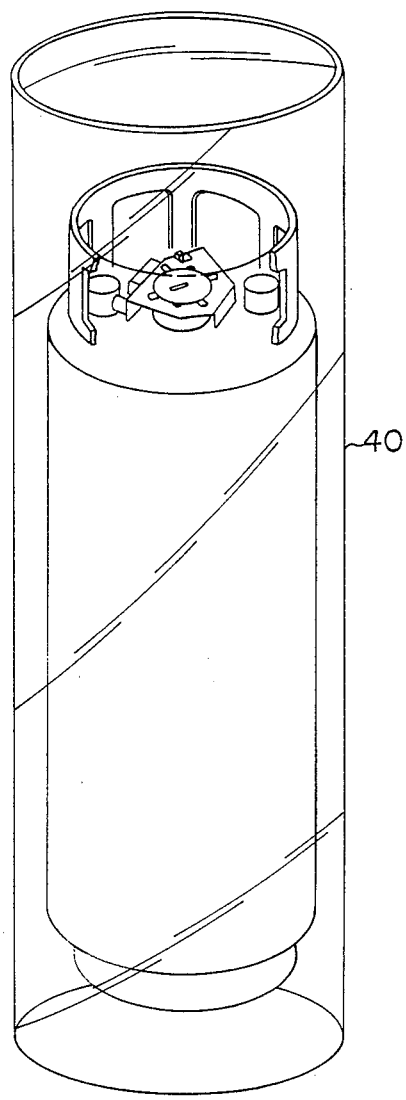
FIG. 5 is a perspective view of the propane fuel tank in FIG. 4, with the oversized, insulating tube positioned over and around it.

Referring now to FIG. 5, a tube 40 is formed of an insulative plastic material, such as, for example, heat shrink polyethylene. In the embodiment shown, the tube is formed of an eight (8) mil thick polyethylene stock which is extruded to provide a seamless structure. However, the tube can be formed by using flat sheet stock joined at a seam to define the tube. The particular type of polyethylene used will shrink up to 70% in the warp direction (defined as the direction of extrusion) and 30% in the fill direction, which is perpendicular to the warp direction. Of course, the polyethylene does not shrink nearly to this extent because of the presence of the tank within the tube when the shrinkage takes place. A common size for a propane tank used on a hot air balloon is 40 inches (102 cm) high and 38 inches (96 cm) in circumference. This size tank holds approximately 10 gallons (38 lit.) of propane.

The insulating tube is formed oversized—about 39 inches (99 cm) in circumference and about 52 inches (132 cm) long. A loose fit of the tube 40 is thereby achieved. The extra length of the tube 40 is evenly apportioned on the top of the tank 15 above collar 27 and below footring 31.

Figure 6:
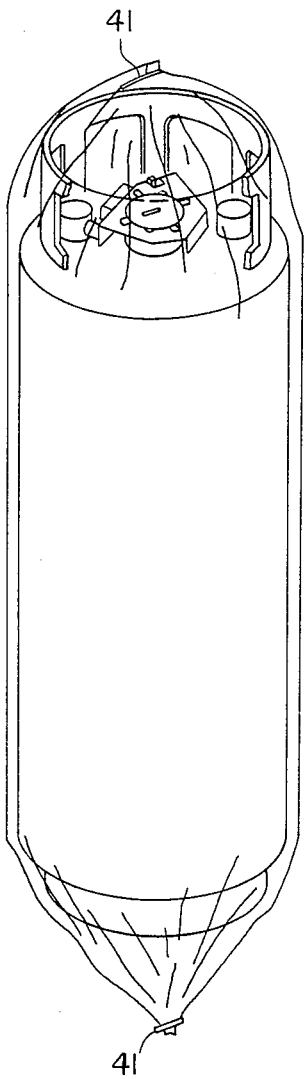
FIG. 6 is a perspective view of the tank shown in FIG. 5, with the tube according to the invention secured top and bottom in preparation for heat shrinking.

Referring now to FIG. 6, the excess length of tube 40 is bunched at the top and bottom with plastic clips 41 or some other suitable fastening device, thereby encapsulating tank 15 inside tube 40. The bunched material is stuffed down into the collar 27 and the footring 31, respectively. Then, the tank 15 is placed in a heating chamber, where heat at a temperature of 40° F. (204° C.) is applied for about 3 minutes. Of course, these are variable and, within limits, less heat for a somewhat longer period of time, and vice versa can be used.

Figure 7:
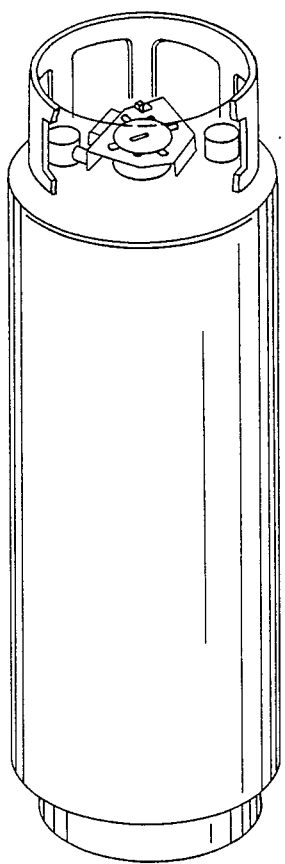
FIG. 7 is a view similar to FIG. 6, after heat shrinking the tube onto the surface of the tank.
Figure 8:
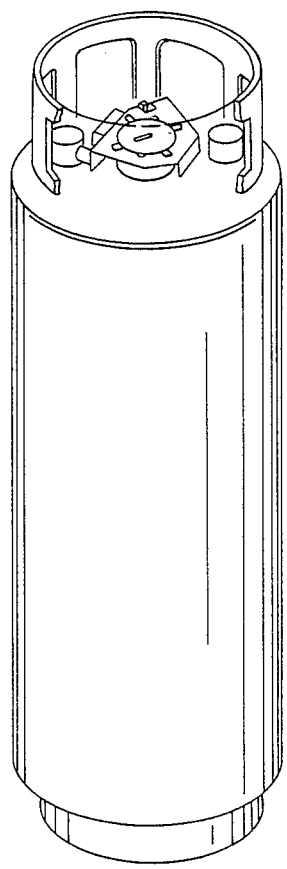
FIG. 8 is a view similar to FIG. 7, after portions of the tube covering the access openings in the collar have been cut away.

As is shown in FIG. 7, the tube 40 shrinks into intimate contact with the wall of the tank 15, including the collar 27, body 30 and footring 31. Since the bunched portion of the tube 40 on opposite ends of the tank extend into the collar 27 and footring 31, the shrunk tube curves over and onto their inner walls and cover the peripheral edges of the collar 27 and footring 31. Then, the access openings 28 are cleared by cutting away the material covering them.

It has been determined through tests that the tube 40 as described above will provide electrical insulation against approximately 8,000 volts. More importantly, it has been determined that at a spacing of 1 inch (25 mm), the tube 40 will provide protection against arc striking at 16,000 volts of AC current.

In addition to these advantages, the tube does not add appreciably to the weight of the tank, is permanent and durable, and need not be removed to service the tank.

An electrically insulated fuel tank for a hot air balloon and a method of constructing such a tank is described above. Various details of the invention may be changed without departing from its scope. Furthermore, the foregoing description of the preferred embodiment according to the present invention is provided for the purpose of illustration only and not for the purpose of limitation—the invention being defined by the claims.

I claim:

1. A method of insulating a propane hot air balloon fuel tank to prevent transmission of electric current through the tank by contact of the tank with a source of current, and penetration of the tank by arcing of electric current from a spaced apart current source and the tank, said method comprising:
   (a) providing an electrically insulative dielectric material in sheet form;
   (b) placing the sheet of insulative material over the outer surfaces of the tank; and
   (c) bonding the sheet of insulative material to the outer surface of the tank.

2. A method according to claim 1, wherein the step of providing an insulative material comprises the step of forming the sheet into a tube.

3. A method according to claim 2, wherein the step of forming the tube comprises forming a seamless tube.

4. A method according to claim 3, wherein the step of forming the tube includes forming the tube in an initially-oversized tube with a diameter greater than the diameter of the tank.

5. A method according to claim 4, wherein the step of bonding the insulative material to the outer surface of the tank comprises the step of shrinking the oversized tube into intimate surface contact with the outer walls of the tank.

6. A method according to claim 5, wherein the step of forming the tube comprises extruding polyethylene in a seamless tube.

7. A method according to claim 5 or 6, wherein the tube is 8 mils thick.

* * * * *